US012783796B2

(12) United States Patent
Liu et al.

(10) Patent No.: US 12,783,796 B2
(45) Date of Patent: Nov. 3, 2026

(54) METHOD FOR SAMPLE AUGMENTATION

(71) Applicant: BEIJING BAIDU NETCOM SCIENCE TECHNOLOGY CO., LTD., Beijing (CN)

(72) Inventors: Jian Liu, Beijing (CN); Jiandong Sun, Bejing (CN); Yabing Shi, Beijing (CN); Ye Jiang, Beijing (CN); Chunguang Chai, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 545 days.

(21) Appl. No.: 18/063,089

(22) Filed: Dec. 8, 2022

(65) Prior Publication Data

US 2023/0103728 A1 Apr. 6, 2023

(30) Foreign Application Priority Data

Dec. 9, 2021 (CN) ......................... 202111501568.8

(51) Int. Cl.
*G06F 40/242* (2020.01)
*G06N 20/00* (2019.01)

(52) U.S. Cl.
CPC ........... *G06F 40/242* (2020.01); *G06N 20/00* (2019.01)

(58) Field of Classification Search
CPC .... G06F 40/216; G06F 40/242; G06F 40/247; G06F 40/284; G06F 40/289;
(Continued)

(56) References Cited

U.S. PATENT DOCUMENTS 11,520,982 B2 * 12/2022 Zhou ..................... G06F 18/295
11,681,944 B2 * 6/2023 Bhat ...................... G06N 20/00 706/12

(Continued)

FOREIGN PATENT DOCUMENTS

CN 107808661 A 3/2018
CN 109754012 A 5/2019

(Continued)

OTHER PUBLICATIONS

Edwards et al.; "Guiding Generative Language Models for Data Augmentation in Few-Shot Text Classification;" Arxiv.org; Nov. 17, 2021 (14 pages) (Year: 2021).*

(Continued)

*Primary Examiner* — Andrew C Flanders
(74) *Attorney, Agent, or Firm* — Osha Bergman Watanabe & Burton LLP

(57) ABSTRACT

A computer-implemented method for sample augmentation includes: acquiring a second sample corpus and second triplet information of the second sample corpus by performing data augmentation on a first sample corpus labeled with first triplet information; acquiring third triplet information of a third sample corpus by performing semi-supervised learning on the third sample corpus that is not labeled with triplet information; and generating a set of training corpora for a triplet information extraction network based on the first sample corpus and the first triplet information, the second sample corpus and the second triplet information, and the third sample corpus and the third triplet information.

16 Claims, 6 Drawing Sheets

(58) Field of Classification Search

CPC ........ G06F 40/295; G06F 40/30; G06F 40/58; G06F 16/3329; G06F 16/3344; G06F 16/35; G06F 16/367; G06F 18/2113; G06F 18/2155; G06N 20/00

See application file for complete search history.

(56) References Cited

U.S. PATENT DOCUMENTS

| | | | | |
|---|---|---|---|---|
| 2009/0119090 | A1* | 5/2009 | Niu | G06F 40/247 704/1 |
| 2011/0270604 | A1* | 11/2011 | Qi | G06F 40/30 704/9 |
| 2013/0246435 | A1* | 9/2013 | Yan | G06F 16/355 707/E17.046 |
| 2014/0046877 | A1* | 2/2014 | Gopalakrishnan | G06F 16/2465 706/12 |
| 2014/0163955 | A1* | 6/2014 | Ng Tari | G06F 40/205 704/9 |
| 2014/0278353 | A1* | 9/2014 | Herdagdelen | G06F 40/40 704/9 |
| 2015/0310128 | A1* | 10/2015 | Brav | G06F 16/9024 707/800 |
| 2016/0371254 | A1* | 12/2016 | Yamagami | G06F 40/30 |
| 2019/0005026 | A1* | 1/2019 | Zhang | G06F 40/295 |
| 2019/0130228 | A1* | 5/2019 | Fu | G06N 5/01 |
| 2019/0205463 | A1* | 7/2019 | Santhanam | G06F 40/216 |
| 2020/0050662 | A1* | 2/2020 | Bhat | G06F 18/211 |
| 2020/0394461 | A1* | 12/2020 | Perera | G06N 7/01 |
| 2021/0004672 | A1* | 1/2021 | Glass | G06F 16/285 |
| 2021/0097136 | A1* | 4/2021 | Zhou | G06F 40/211 |
| 2021/0216885 | A1* | 7/2021 | Huang | G06F 18/2148 |
| 2021/0357595 | A1* | 11/2021 | Perez | G06N 3/044 |
| 2021/0383066 | A1* | 12/2021 | Zhu | G06N 20/00 |
| 2022/0067590 | A1* | 3/2022 | Georgopoulos | G06N 5/04 |
| 2022/0084510 | A1* | 3/2022 | Peng | G10L 15/063 |
| 2022/0139372 | A1* | 5/2022 | Muschett | G06F 40/216 704/257 |
| 2022/0215209 | A1* | 7/2022 | Luong | G06N 3/045 |
| 2022/0309254 | A1* | 9/2022 | Kotnis | G06F 40/49 |
| 2023/0351111 | A1* | 11/2023 | Fauqueur | G06F 16/367 |

FOREIGN PATENT DOCUMENTS

| | | | | | |
|---|---|---|---|---|---|
| CN | 110298032 | A | | 10/2019 | |
| CN | 111144120 | A | | 5/2020 | |
| CN | 111460825 | A | | 7/2020 | |
| CN | 112036186 | A | | 12/2020 | |
| CN | 112132179 | A | | 12/2020 | |
| CN | 112380864 | A | | 2/2021 | |
| CN | 112507125 | A | | 3/2021 | |
| CN | 112651238 | A | | 4/2021 | |
| CN | 114398943 | A | | 4/2022 | |
| KR | 20200071877 | A | * | 6/2020 | G06N 20/00 |

OTHER PUBLICATIONS

Extended European Search Report issued in European Application No. 22211847.3 mailed on Apr. 12, 2023 (8 pages).

Dhole et al.; "NL-Augmenter: A Framework for Task-Sensitive Natural Language Augmentation" Arxiv.Org; Dec. 6, 2021; (39 pages).

Edwards et al.; "Guiding Generative Language Models for Data Augmentation in Few-Shot Text Classification;" Arxiv. org; Nov. 17, 2021 (14 pages).

Anaby-Tavor et al.; "Not Enough Data? Deep Learning to the Rescue!; " Arxiv.org; Nov. 9, 2019; (20 pages).

Office Action for corresponding Chinese patent application 202111501568.8 issued Aug. 2, 2022 (26 pages).

Second Office Action issued for corresponding Chinese patent application 202111501568.8, issued Nov. 2, 2022 (35 pages).

Huang Peixin, et al. "End-to-end Knowledge Triplet Extraction Combined with Adversarial Training;" Journey of Computer Research and Development; pp. 2536-2548; 2019 (13 pages).

"Semi-Supervised Named Entity Recognition Based on Deep Learning;" May 26, 2019 (40 pages).

* cited by examiner

METHOD FOR SAMPLE AUGMENTATION

CROSS REFERENCE TO RELATED APPLICATIONS

This application claims priority to Chinese Patent Application No. 202111501568.8, filed on Dec. 9, 2021, the entire disclosure of which is incorporated herein by reference.

TECHNICAL FIELD

The disclosure relates to a field of artificial intelligence (AI) technologies, particularly to fields of a knowledge graph and natural language processing, and specifically to a method and an apparatus for sample augmentation.

BACKGROUND

In the related art, it is of high cost to label a large number of corpora when extracting triplet information from the corpora. However, a simple vocabulary augmentation effect is not obvious and may lead to semantic loss of corpora. When the corpora is input into a model for recognition, since an entity recognition subtask is independent from a relationship classification subtask, a correlation between two subtasks is ignored, causing that feature information of the two subtasks may not be interacted.

SUMMARY

According to a first aspect of the disclosure, a computer-implemented method for data augmentation is provided. The method includes: acquiring a second sample corpus and second triplet information of the second sample corpus, by performing data augmentation on a first sample corpus labeled with first triplet information; acquiring third triplet information of a third sample corpus, by performing semi-supervised learning on the third sample corpus that is not labeled triplet information; and generating a set of training corpora for a triplet information extraction network, based on the first sample corpus and the first triplet information, the second sample corpus and the second triplet information, as well as the third sample corpus and the third triplet information.

According to a second aspect of the present disclosure, an electronic device is provided, and includes: at least one processor; and a memory communicatively connected to at least one processor. The memory stores instructions executable by the at least one processor, and the instructions are performed by the at least one processor, to cause the at least one processor to perform a method for data augmentation. The method includes: acquiring a second sample corpus and second triplet information of the second sample corpus, by performing data augmentation on a first sample corpus labeled with first triplet information; acquiring third triplet information of a third sample corpus, by performing semi-supervised learning on the third sample corpus that is not labeled triplet information; and generating a set of training corpora for a triplet information extraction network, based on the first sample corpus and the first triplet information, the second sample corpus and the second triplet information, as well as the third sample corpus and the third triplet information.

According to another aspect of the present disclosure, a non-transitory computer-readable storage medium stored with computer instructions is provided, in which the computer instructions are configured to perform a method for data augmentation by a computer. The method includes: acquiring a second sample corpus and second triplet information of the second sample corpus, by performing data augmentation on a first sample corpus labeled with first triplet information; acquiring third triplet information of a third sample corpus, by performing semi-supervised learning on the third sample corpus that is not labeled triplet information; and generating a set of training corpora for a triplet information extraction network, based on the first sample corpus and the first triplet information, the second sample corpus and the second triplet information, as well as the third sample corpus and the third triplet information.

It should be understood that, the content described in the part is not intended to identify key or important features of embodiments of the present disclosure, nor intended to limit the scope of the present disclosure. Other features of the present disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope of the present disclosure. Similarly, for clarity and conciseness, descriptions of well-known functions and structures are omitted in the following descriptions.

Artificial intelligence (AI) is a subject that learns simulating certain thinking processes and intelligent behaviors (such as learning, reasoning, thinking, planning, etc.) of human beings by a computer, which covers hardware-level technologies and software-level technologies. AI software technologies generally include computer vision technology, speech recognition technology, natural language processing (NLP) technology and its major aspects such as, learning/deep learning (DL), big data processing technology, knowledge graph technology, etc.

A knowledge graph, referred to as a knowledge domain visualization map or a knowledge domain mapping map, is a series of different graphics that display a knowledge development process and a structure relationship and describe knowledge resources and their carriers using visualization technology, mine, analyze, build, draw and display knowledge and interaction thereof.

Natural language processing (NLP) is an important direction in the fields of computer science and artificial intelligence. It studies all kinds of theories and methods that may achieve effective communication between humans and computers by natural language. NLP is a science that integrates linguistics, computer science, and mathematics. The research of NLP relates to natural language, that is, the language people use every day. Therefore, it is closely related to the study of linguistics, but with important differences. NLP is aimed at studying a computer system (especially a software system) that may effectively achieve natural language communication rather than to generally study natural language.

Figure 1:
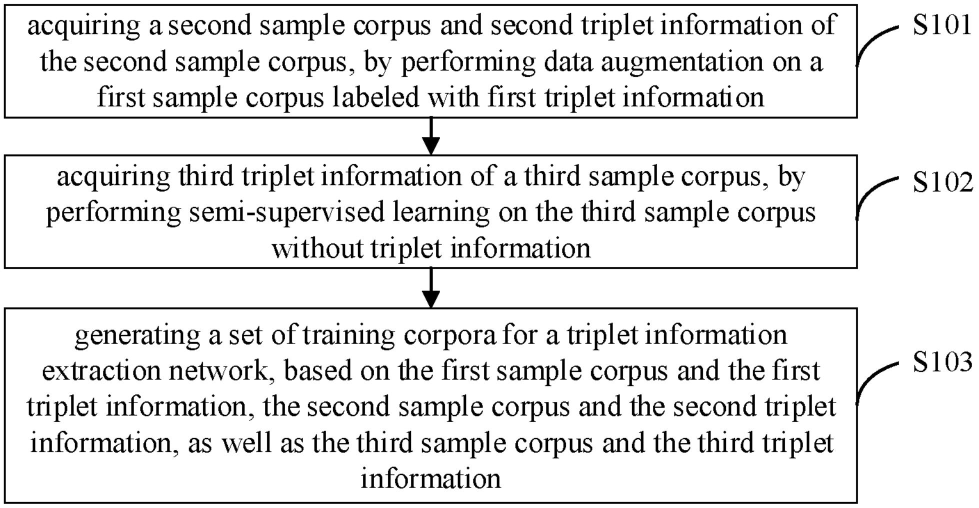
FIG. 1 is a diagram illustrating a method for data augmentation according to an example of the present disclosure.

FIG. 1 is a diagram illustrating a method for data augmentation according to an example of the present disclosure. As illustrated in FIG. 1, the method for sample augmentation includes the following steps at S101-S103.

At S101, a second sample corpus and triplet information of the second sample corpus are acquired, by performing data augmentation on a first sample corpus labeled with first triplet information.

Information Extraction (IE) is a tabular form of organization by structuring information contained in a text, and the goal is to recognize various elements appearing in the text, such as a time, a location, a character and a relationship between elements.

In the disclosure, the triplet information of the sample corpus is acquired based on the IE. Alternatively, the triplet information may be a SPO {Subject, Predicate, Object} triplet information, that is, knowledge triplet information. Subject refers to an entity, which generally refers to a real thing that may be identified by a name, such as a person name, a place name, an organization name, and further includes a time expression, a digital number expression, an address, etc. Predicate refers to a relationship between entities or attributes of entities. Object refers to an attribute value of an entity or an associated entity. For example, when SPO triplet information is {A company, product, mobile phone}, the meaning represented by the SPO triplet information is that the product produced by the company A is a mobile phone, where A company is an entity, the product is a relationship between entities, and the mobile phone is an associated entity.

After the first sample corpus labeled with first triplet information is acquired, in order to avoid an inaccurate model extraction result due to a few number of labeled first sample corpora, data augmentation needs to be performed on the first sample corpus. Data augmentation is an effective method for expanding a data sample scale, so that the data scale is increased, and the model may have a good generalization ability.

The corpus acquired after data augmentation is taken as a second sample corpus, and the triplet information corresponding to the second sample corpus is taken as second triplet information. Alternatively, when data augmentation is performed on the first sample corpus, entity replacement, synonym replacement, token replacement of the same entity category and back translation may be adopted.

At S102, triplet information of a third sample corpus is acquired, by performing semi-supervised learning on the third sample corpus without triplet information.

In order to expand a data sample scale, semi-supervised learning (SSL) is performed on the third sample corpus which does not have triplet information, and the third triplet information of the third sample corpus after semi-supervised learning is acquired. SSL is a learning method that combines supervised learning and non-supervised learning, and SSL performs model recognition using a large amount of unlabeled data and labeled data.

Alternatively, SSL may be performed on the third sample corpus without triplet information by using a positive-unlabeled learning (PU Learning) algorithm and a self-training algorithm.

At S103, a set of training corpora for a triplet information extraction network is generated, based on the first sample corpus and the first triplet information, the second sample corpus and the second triplet information, as well as the third sample corpus and the third triplet information.

The set of training corpora for a triplet information extraction network is generated by combining the first sample corpus and the first triplet information, the second sample corpus and the second triplet information, and the third sample corpus and the third triplet information acquired.

In the method for data augmentation according to the disclosure, the second sample corpus and the second triplet information of the second sample corpus are acquired, by performing data augmentation on the first sample corpus labeled with first triplet information; third triplet information of the third sample corpus is acquired, by performing SSL on the third sample corpus without triplet information; and the set of training corpora for the triplet information extraction network is generated, based on the first sample corpus and the first triplet information, the second sample corpus and the second triplet information, as well as the third sample corpus and the third triplet information. Data augmentation and SSL in the disclosure may expand/augment data, and may significantly improve the effect of extracting a SPO triplet. The data quality generated by data augmentation is relatively high, and SSL may dramatically reduce a model prediction variance and improve a model effect through a multi-model voting method. Therefore, based on the method in the disclosure, only a small amount of labeled data is needed to achieve a good result, which greatly reduces the labor cost.

Further, in order to expand the form of the set of training corpora and enhance a generalization ability of the triplet information extraction network, data augmentation needs to be performed on the first sample corpus labeled with first triplet information. The second sample corpus and second triplet information of the second sample corpus are acquired, by performing data augmentation on the first sample corpus labeled with first triplet information. Alternatively, the second sample corpus and the second triplet information are acquired by performing data augmentation on the first sample corpus, based on at least one data augmentation operation of: entity replacement, synonym replacement, token replacement of the same entity category and back translation. The four methods are described below, respectively.

Figure 2:
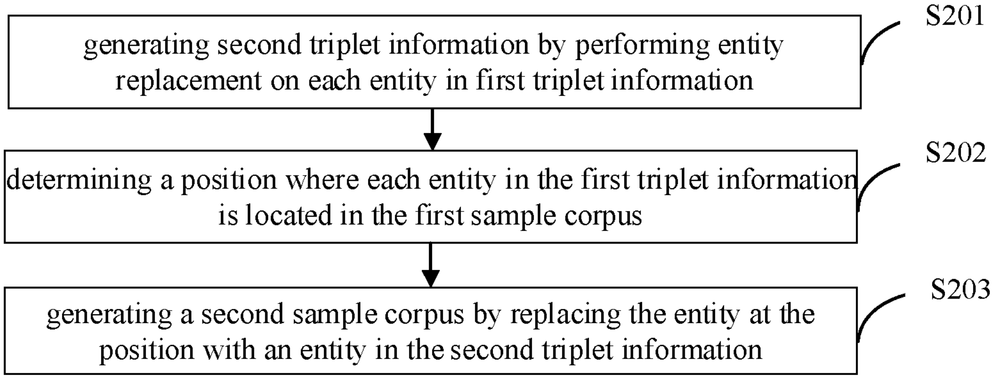
FIG. 2 is a diagram illustrating acquiring a second sample corpus and second triplet information by performing data augmentation on a first sample corpus based on entity replacement according to an example of the present disclosure.

FIG. 2 is an example illustrating a method for data augmentation according to the present disclosure. As illustrated in FIG. 2, the second sample corpus and second triplet information are acquired by performing data augmentation on the first sample corpus based on the entity replacement, including the following steps S201-S203.

At S201, second triplet information is generated by performing entity replacement on each entity in first triplet information.

The entities in the entity replacement refer to be a Subject entity and an Object associated entity in the first triplet information, and the entity replacement refers to replacing the Subject entity with an entity of the same category and replacing the Object associated entity in the first triplet information with an entity of the same category, to generate second triplet information after entity replacement.

When the entity replacement is performed on entities in the first triplet information, candidate entities for replacement may be determined based on a category of each entity in the first triplet information, the candidate entities for replacement come from the same category of entities in the first sample corpus or from a preset entity-category vocabulary list.

Since there is an overlapping relationship between the entities in some first triplet information, and there is no overlapping relationship between the entities in some first triplet information, whether there is an overlapping relationship between the entities in the first triplet information needs to be recognized, and a target entity dictionary for entity replacement is determined based on a recognition result of the overlapping relationship.

As an implementation, when the recognition result indicates that there is no overlapping relationship between the entities in the first triplet information, a category of each entity in the first triplet information is acquired, and an entity dictionary corresponding to the category of each entity is determined as the target entity dictionary. For example, when the first triplet information is {A company, product, mobile phone}, and there is no overlapping relationship between "A company" and "mobile phone", a category of each entity in the first triplet information is acquired, and an entity dictionary corresponding to the entity category is determined. For example, the target entity dictionary corresponding to the S (Subject) entity is a company dictionary: A company, B company, C company, D company, . . . . The target entity dictionary corresponding to the O (Object) entity may be a product dictionary: a mobile phone, a tablet, tissue, a tea set.

As another implementation, when a recognition result indicates that there is an overlapping relationship between the entities in the first triplet information, an overlapping entity dictionary is acquired as the target entity dictionary corresponding to the overlapping entity, in which the overlapping entity dictionary includes entity pairs with an overlapping relationship. For example, when the first triplet information is {Xinjiang, specialty, Xinjiang jujube}, and the O entity "Xinjiang jujube" corresponds to the entity "Xinjiang" and the entity "jujube", there is an overlapping relationship between the O entity "Xinjiang jujube" and the S entity. The overlapping entity dictionary is acquired as a target entity dictionary corresponding to the overlapping entity, the overlapping entity dictionary includes entity pairs with an overlapping relationship, for example, "Shandong-Shandong green Chinese onion", "Beijing-Beijing Tomatoes on sticks".

An entity category pair is acquired from the entity pair with the overlapping relationship in the first triplet information, and a replacement entity pair matching the entity category pair is acquired from the overlapping entity dictionary, and second triplet information is generated by replacing the entity pair with the overlapping relationship with the replacement entity pair. For example, for the first triplet information {Xinjiang, specialty, Xinjiang jujube}, "Xinjiang jujube" may be replaced with "Shandong green Chinese onion" or "Beijing Tanghulu", to obtain the second triplet information {Shandong, specialty, Shandong green Chinese onion} and the second triplet information (Beijing, specialty, Beijing Tomatoes on sticks).

At S202, a position where each entity in the first triplet information is located in the first sample corpus is determined.

The position where each entity in the first triplet information is located in the first sample corpus is determined. For example, it may be determined that the word number in the first sample corpus where each entity in the first triplet information is located. For example, when the first sample corpus is "The product of A company is a mobile phone, I tried it, and it is quite good", the first triplet information is {A company, product, mobile phone}, the S entity and the O entity in the first triplet information are correspondingly "A company" and "mobile phone", the position of "A company" in the first sample corpus is from the 4th word to the 5th word, and the position of "mobile phone" in the first sample corpus is from the 8th word to the 9th word.

At S203, a second sample corpus is generated by replacing the entity at the position with an entity in the second triplet information.

The generated corpus is taken as a second sample corpus by replacing the entity at the determined position in the first sample corpus of the entity in the first triplet information with an entity in the second triplet information.

For example, the first sample corpus is "The product of A company is a mobile phone, I tried it, and it is quite good", entity replacement is performed on the "A company" based on the target entity dictionary corresponding to "A company", and entity replacement is performed on "mobile phone" based on the target entity dictionary corresponding to "mobile phone". For example, the second sample corpus generated after replacement may be "The product of B company is a tea set, I tried it, and it is quite good", and "The product of E company is a lamp, I tried it, and it is quite good".

The disclosure takes generating two second sample corpora with one first sample corpus for an example, which does not constitute a limitation of the disclosure, and a number of second sample corpora generated based on the first sample corpus may be determined based on the configuration of the personnel in actual use.

It needs to be noted that, when the replacement entity contains than one token, the BIO (B-begin, I-inside, O-outside) label is extended in sequence. For example, when the replacement entity is “Zhang San shi ge you xiu de ming xing (its English translation: Zhang San is an excellent star)”, the corresponding BIO label is BIOOOOOBI, and when it is replaced with “Li Er Zhu shi ge you xiu de ming xing (its English: Li Erzhu is an excellent star”, the corresponding expanded BIO label after replacement is BIIOOOOOBI.

In the embodiment of the disclosure, a second sample corpus and second triplet information are acquired by performing data augmentation on a first sample corpus based on entity replacement, which reduces semantic loss, improves an extraction effect of triplet information. The different dictionaries are designed based on whether there is an overlapping relationship between entities, which is more applied to various industries.

Figure 3:
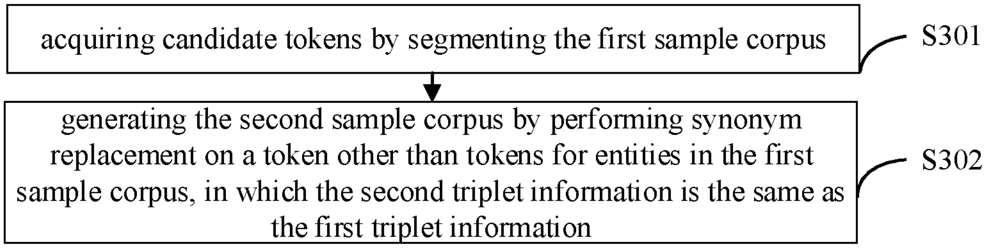
FIG. 3 is a diagram illustrating acquiring a second sample corpus and second triplet information by performing data augmentation on a first sample corpus based on synonym replacement according to an example of the present disclosure.

FIG. 3 is an example illustrating a method for data augmentation according to the present disclosure. As illustrated in FIG. 3, a second sample corpus and second triplet information are acquired by performing data augmentation on a first sample corpus based on synonym replacement, including the following steps at S301-S302.

At S301, candidate tokens are acquired by segmenting the first sample corpus.

The candidate tokens are acquired by segmenting the first sample corpus. For example, when the first sample corpus is “The product of H company is dessert, I tasted two yesterday, their taste is pretty good”, segmentation is performed on the first sample corpus, to obtain candidate tokens: “H”, “company”, “product”, “dessert”, “I”, “yesterday”, “tasted”, “two”, “taste”, “good”.

At S302, a second sample corpus is generated by performing synonym replacement on a token other than the entity in the first sample corpus. The second triplet information is the same as the first triplet information.

The synonym word refers to a word with the same or similar semantic meaning. In the embodiment of the disclosure, synonym replacement means that tokens other than the Subject entity and the Object associated entity in the first triplet information corresponding to the first sample corpus are randomly replaced with tokens in different expressions and with the same or similar semantics, to generate a second sample corpus.

The first triplet information corresponding to the first sample corpus “The product of H company is dessert, I tasted two yesterday, their taste is pretty good” is {H company, product, dessert}, synonym replacement is performed on the candidate tokens to be replaced that are extracted in some probability from tokens other than entities in the first sample corpus, to generate a second sample corpus.

Alternatively, the probability may be artificially set or randomly determined, ranging from 0.1 to 1, and alternatively, the probability may follow a binomial distribution. For example, the second sample corpus may be “The product of H Company is dessert, I tasted two today, their taste is very good” or “The product of H Company is dessert, I tasted five the day before yesterday, their taste is very special”. Since synonym replacement is not performed on the entities in the first sample corpus, the second triplet information corresponding to the second sample corpus is the same as the first triplet information corresponding to the first sample corpus.

In the embodiment of the disclosure, the second sample corpus and second triplet information are acquired by performing data augmentation on the first sample corpus based on synonym replacement, which reduces semantic loss and improves an extraction effect of triplet information.

Figure 4:
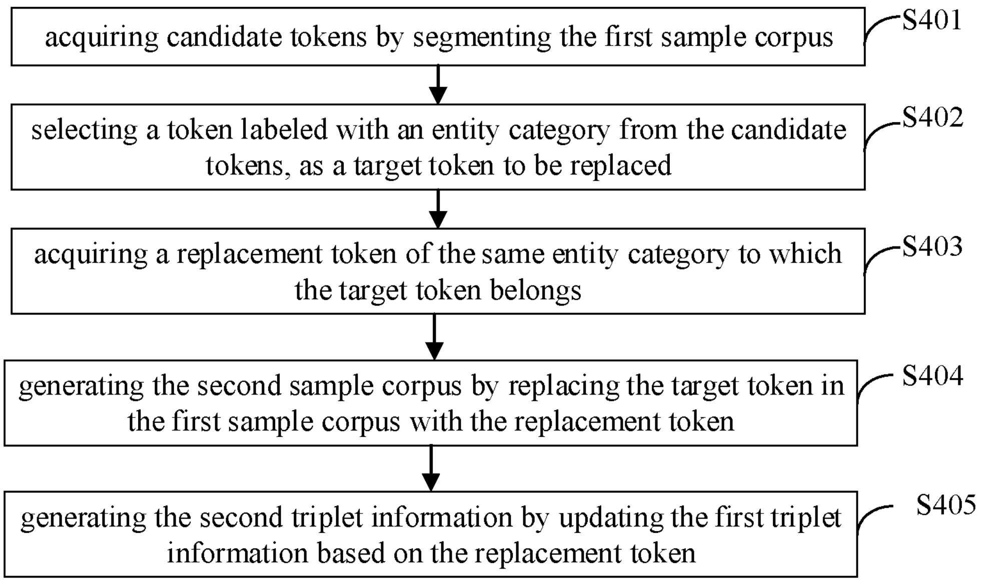
FIG. 4 is a diagram illustrating acquiring a second sample corpus and second triplet information by performing data augmentation on a first sample corpus based on token replacement of the same entity category according to an example of the present disclosure.

FIG. 4 is an example illustrating a method for data augmentation according to the present disclosure. As illustrated in FIG. 4, the second sample corpus and second triplet information are acquired by performing data augmentation on the first sample corpus based on token replacement of the same entity category, including the following steps at S401-S405.

At S401, candidate tokens are acquired by segmenting the first sample corpus.

The token replacement means that the token belonging to an entity in the first sample corpus is taken as a token to be replaced, and the token to be replaced is replaced with a token whose entity category is the same as the category of the token to be replaced.

The candidate tokens are acquired by segmenting the first sample corpus. For example, when the first sample corpus is “The produce of H company in A city is Xinjiang jujube, and its taste is pretty good”, the corresponding first triplet information is {H company in A city, product, Xinjiang jujube}. The candidate tokens obtained by segmenting the first sample corpus are “A city”, “H”, “company”, “product”, “Xinjiang”, “jujube”, “taste”, “good”.

At S402, a token labeled with an entity category is selected from the candidate tokens, as a target token to be replaced.

Recognition of a BIO category is performed on the candidate tokens, to determine a BIO label of each token. The candidate tokens labeled with B category and candidate tokens labeled with I category may be selected as tokens labeled with the entity category, which are determined as the target tokens to be replaced.

For example, tokens “A city”, “H”, “company” and “Xinjiang”, “jujube” with an entity category are selected from the above candidate tokens.

At S403, a replacement token of the same entity category to which the target token belongs is acquired.

The replacement token of the same entity category to which the target token belongs is acquired. For example, the replacement token of “H company in A city” may be determined as “B company in A city”, and the replacement token of “Xinjiang jujube” may be determined as “Xinjiang Hami melon”.

At S404, the second sample corpus is generated by replacing the target token in the first sample corpus with the replacement token.

The second sample corpus is generated by replacing the target token in the first sample corpus with the replacement token. For example, the replacement token of “H company in A city” may be determined as “B company in A city”, and the replacement token of “Xinjiang jujube” may be determined as “Xinjiang Hami melon”, then the second sample corpus is “The product of B company in A city is Xinjiang Hami melon, its taste is pretty good”.

At S405, the second triplet information is generated by updating first triplet information based on the replacement token.

The second triplet information is generated based on the second sample corpus generated after token replacement. For example, the second triplet information corresponding to the second sample corpus “The product of B company in A city is Xinjiang jujube, its taste is pretty good” is {B company in A city, product, Xinjiang jujube}.

It needs to be noted that, when the replacement token contains more than one token, the MO (B-begin, I-inside, O-outside) label is extended in sequence.

In the embodiment of the disclosure, the second sample corpus and second triplet information are acquired by performing data augmentation on the first sample corpus based on token replacement of the same entity category, which reduces semantic loss and improves an extraction effect of triplet information.

Figure 5:
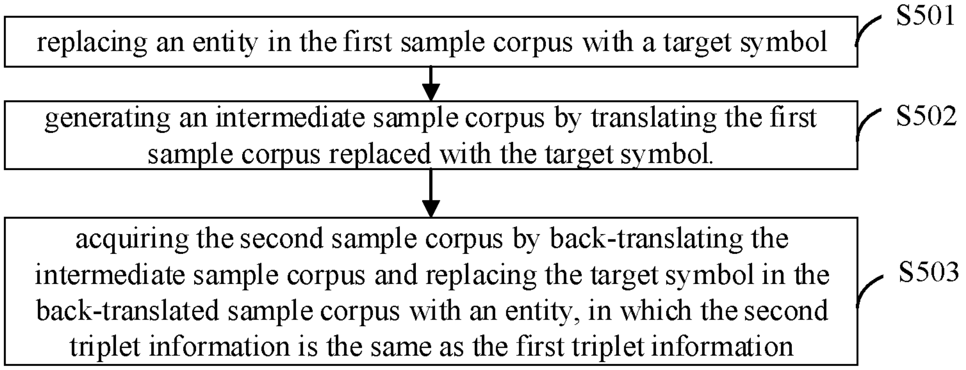
FIG. 5 is a diagram illustrating acquiring a second sample corpus and second triplet information by performing data augmentation on a first sample corpus based on back translation according to an example of the present disclosure.

FIG. 5 is an example illustrating a method for data augmentation according to the present disclosure. As illustrated in FIG. 5, acquiring the second sample corpus and second triplet information by performing data augmentation on the first sample corpus based on back translation, includes the following steps at S501-S503.

At S501, an entity in the first sample corpus is replaced with a target symbol.

The back translation means that, the first sample corpus is translated into an intermediate language and the intermediate language is retranslated into a source language of the first sample corpus, so as to perform data augmentation on the first sample corpus and acquire a second sample corpus.

In order to ensure the integrity of an entity before and after translation, the entity in the first sample corpus is replaced with the target symbol. For example, when the first sample corpus is "The product of H company is dessert, I tasted two yesterday, their taste is pretty good", the entity "H company" may be replaced with "MMM", and the entity "desert" may be replaced with "NN".

At S502, an intermediate sample corpus is generated by translating the first sample corpus replaced with the target symbol.

The entity "H company" of the above first sample corpus "The product of H company is dessert, I tasted two yesterday, their taste is pretty good" is replaced with "MMM", the entity "desert" may be replaced with "NN", to obtain the replaced first sample corpus "The product of MMM is NN, I tasted two yesterday, their taste is pretty good". The intermediate sample corpus is generated by translating the replaced first sample corpus. Alternatively, it may be translated in English, Italian, French and other languages.

For example, the replaced first sample corpus may be translated in English, to acquire the intermediate sample corpus "MMM's product is NN, I tasted two yesterday and they tasted pretty good".

At S503, the second sample corpus is acquired by back translating the intermediate sample corpus and replacing the target symbol in the back-translated sample corpus with an entity, in which the second triplet information is the same as the first triplet information.

The second sample corpus is acquired, by back translating the intermediate sample corpus and replacing the target symbol in the back-translated sample corpus with the entity.

For example, the intermediate sample corpus "MMM's product is NN, I tasted two yesterday and they tasted pretty good" is back-translated, the back-translated sample corpus in Chinese "MMM的产品是NN, 我昨天尝了两个，味道还不错" is acquired, and the target symbols in the back-translated sample corpus are replaced with entities. That is, "MMM" is replaced with "H company", and "NN" is replaced with "dessert", to obtain a sample corpus after replacement in Chinese "H公司的产品是甜点，我昨天尝了两个，味道还不错" as the second sample corpus.

In the embodiment of the disclosure, the second sample corpus and second triplet information are acquired by performing data augmentation on the first sample corpus based on back translation, which reduces semantic loss and improves an extraction effect of triplet information.

Figure 6:
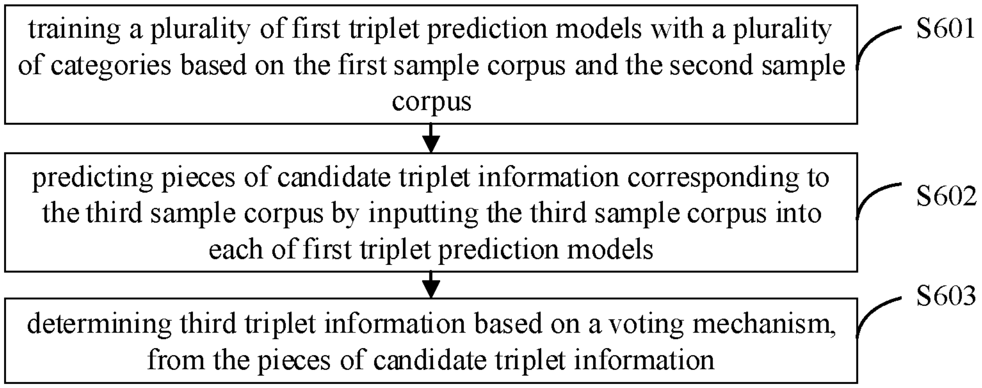
FIG. 6 is a diagram illustrating acquiring third triplet information of a third sample corpus according to an example of the present disclosure.

FIG. 6 is an example illustrating a method for data augmentation according to the present disclosure. As illustrated in FIG. 6, acquiring third triplet information of a third sample corpus by performing SSL on a third sample corpus without triplet information, includes the following steps at S601-S603.

At S601, a plurality of first triplet prediction models with a plurality of categories are trained based on the first sample corpus and the second sample corpus.

The plurality of first triplet prediction models with the plurality of categories are acquired by training the acquired first sample corpus and the second sample corpus. For example, first triplet prediction models with 5 categories are acquired by training the acquired first sample corpus and the second sample corpus.

At S602, pieces of candidate triplet information corresponding to the third sample corpus are predicted by inputting the third sample corpus into each of first triplet prediction models.

The third sample corpus is input into each of first triplet prediction models, to predict the pieces of candidate triplet information corresponding to the third sample corpus. The third sample corpus is an unlabeled sample corpus. For example, 5 pieces of candidate triplet information corresponding to the third sample corpus is predicted by inputting the third sample corpus into 5 first triplet prediction models.

At S603, the third triplet information is determined based on a voting mechanism, from pieces of candidate triplet information.

The third triplet information is determined based on the voting mechanism, from the pieces of candidate triplet information. For example, when 3 first triplet prediction models or more than 3 first triplet prediction models predict the same piece of candidate triplet information in the 5 pieces of candidate triplet information output by 5 first triplet prediction models, the piece of candidate triplet information is determined as the third triplet information.

In the embodiment of the present disclosure, the third triplet information of the third sample corpus is acquired, by performing SSL on the third sample corpus without triplet information, which increases the number of high quality sample corpora and triplet information, reduces semantic loss and improves an extraction effect of triplet information.

Figure 7:
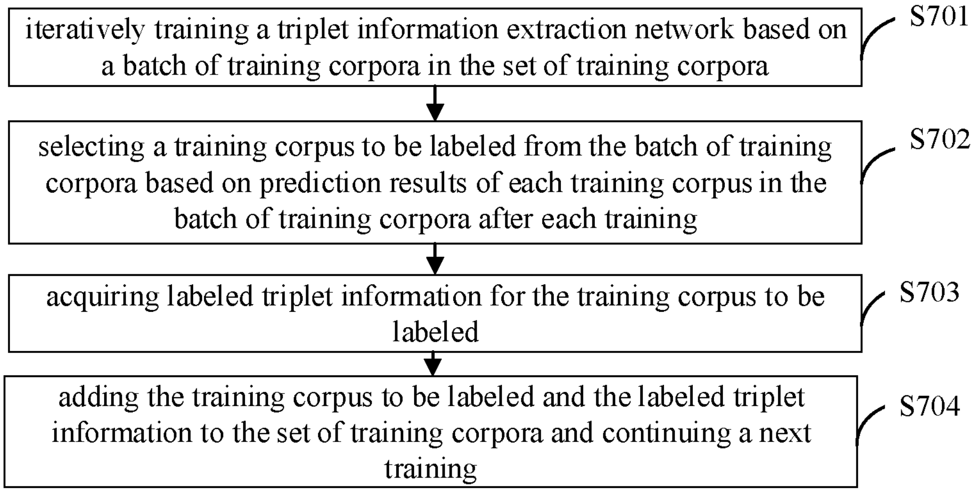
FIG. 7 is a diagram illustrating training a triplet information extraction network according to an example of the present disclosure.

FIG. 7 is a diagram illustrating a method for data augmentation according to an example of the present disclosure. As illustrated in FIG. 7, after the set of training corpora for the triplet information extraction network is generated, it further includes the following steps at S701-S704. At S701, a triplet information extraction network is iteratively trained based on a batch of training corpora in the set of training corpora.

Figure 8:
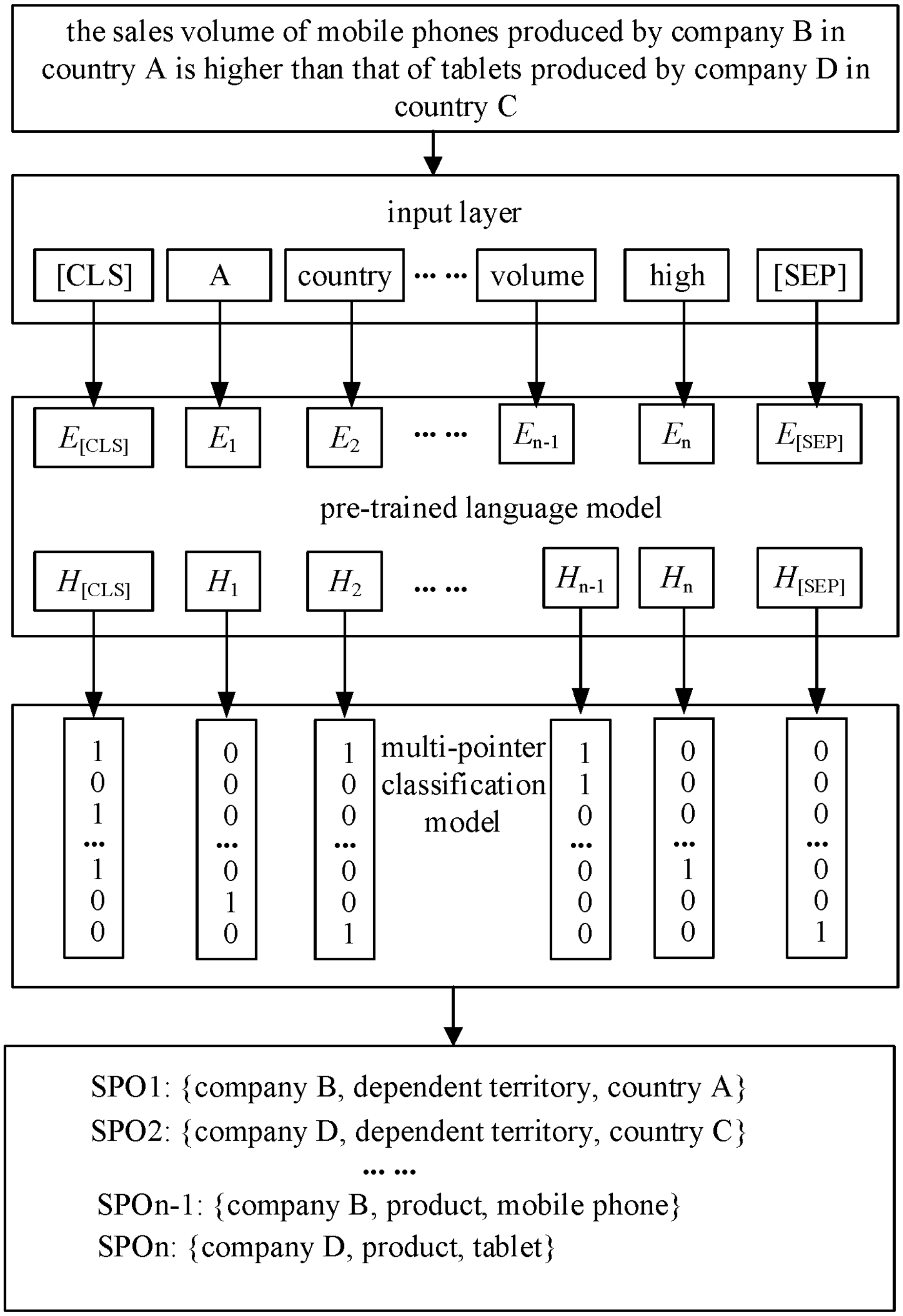
FIG. 8 is a diagram illustrating acquiring triplet information of a set of training corpora according to an example of the present disclosure.

Tokens of the training corpus are acquired by segmenting the set of training corpus, and a word coding of each of the tokens is acquired. FIG. 8 is a diagram illustrating acquiring triplet information of the set of training corpora. As illustrated in FIG. 8, the set of training corpora is segmented at an input layer, and a word coding of each token is acquired. For example, when a certain training corpus is "A国B公司生产的手机比C国D公司生产的平板销量高 (the sales volume of mobile phones produced by company B in country A is higher than that of tablets produced by company D in country C)", 『[CLS]|A|国|B|公|司|生|产|的|手|机|比|C|国|D|公|司|生|产|的|平|板|销|量|高| [SEP]』 may be obtained by segmenting the training corpus, and each token is encoded. The word coding of each token may be expressed as $E_{[CLS]}$, $E_1$, $E_2$ . . . $E_{n-1}$, $E_n$, $E_{[SEP]}$, in which n is a total number of Chinese characters and punctuation marks in any training corpus segmented.

As illustrated in FIG. 8, a semantic representation vector of each of the tokens is output by inputting the word coding of each of the tokens into a pre-trained language model in the triplet information extraction network for context association. It may be expressed as: $H_{[CLS]}$, $H_1$, $H_2 \ldots H_{n-1}$, $H_n$, $H_{[SEP]}$.

As illustrated in FIG. 8, the semantic representation vector of each of the tokens is input into a multi-pointer classification model for prediction of the entity category. Alternatively, the labels of category prediction may be expressed as 010 . . . 100,000 . . . 010, etc., to output predicted triplet information of the training corpus.

In the training corpus, first candidate entities predicted as a first entity category and second candidate entities predicted as a second entity category are acquired. The first entity category is the S entity in the SPO triplet information, and the second entity category is the O entity in the SPO triplet information.

An entity with a prediction probability greater than a first set threshold is selected from the first candidate entities, and the entity is determined as a target first entity. For example, the first set threshold may be set to 0.5, an entity with a prediction probability greater than 0.5 is selected from the first candidate entities, and the entity is determined as the target first entity.

An entity with a prediction probability greater than a second set threshold is selected from the second candidate entities, and the entity is determined as a target second entity. For example, the second set threshold may be set to 0.5, an entity with a prediction probability greater than 0.5 is selected from the second candidate entities, and the entity is determined as the target second entity.

Prediction triplet information of the training corpus is generated based on the determined target first entity and the target second entity, which may be illustrated in three ways.

As an implementation, a first entity pair is determined by combining the target first entity with the target second entity, and the prediction triplet information of the training corpus is generated based on the first entity pair and an entity relationship of the first entity pair. For example, the first entity pair may be "A country" and "B company", the entity relationship between the first entity pair and the first entity pair is that the dependent territory of B company is A country, and the prediction triplet information of the training corpus is {B company, dependent territory, A country}.

As another implementation, a distance between the target first entity and the target second entity is acquired, a second entity pair is determined based on the distance, and the prediction triplet information of the training corpus is generated based on the second entity pair and an entity relationship of the second entity pair. Alternatively, a similarity between the target first entity and the target second entity may be acquired. An entity pair (a target first entity and a target second entity) with the similarity greater than a similarity threshold are selected as the second entity pair, and the prediction triplet information of the training corpus is generated based on the second entity pair and the entity relationship of the second entity pair. Alternatively, an Euclidean distance between the target first entity and the target second entity may be acquired, and an entity pair with the Euclidean distance less than the distance threshold are selected as the second entity pair, and the prediction triplet information of the training corpus is generated based on the second entity pair and the entity relationship of the second entity pair.

As another implementation, a distance between the target first entity and the target second entity is acquired, a third entity pair is determined based on the distance and a position of the target first entity and the target second entity located in the training corpus, for example, the target first entity needs to be in front of the target second entity, and the prediction triplet information of the training corpus is generated based on an entity relationship of the third entity pair and the third entity pair. Alternatively, a similarity between the target first entity and the target second entity may be acquired. An entity pair (a target first entity and a target second entity) with the similarity greater than the similarity threshold and where the target first entity in the corpus is located in front of the target second entity, may be selected as the third entity pair. Alternatively, the Euclidean distance between the target first entity and the target second entity may be acquired, and an entity pair with the Euclidean distance less than the distance threshold and the position of the target first entity in the corpus being in front of the target second entity are selected as the third entity pair.

A target triplet information extraction network is generated, by adjusting the triplet information extraction network based on the labeled triplet of the training corpus and the prediction triplet information.

At S702, a training corpus to be labeled is selected from the batch of training corpora based on prediction results of each training corpus in the batch of training corpora after each training.

The training corpus to be labeled is selected from the batch of training corpora based on the prediction results of each training corpus of training corpora after each training. Alternatively, the scores corresponding to the S entity and the O entity in the prediction result are added to acquire a confidence of the prediction result, and the confidences of all prediction results are sorted to take out a set number of samples with the lowest confidence as the training corpora to be labeled. For example, when the set number is 70, 70 samples with the lowest confidence are taken out as the training corpora to be labeled.

At S703, labeled triplet information for the training corpus to be labeled is acquired.

The training corpus to be labeled is labeled, and the labeled triplet information corresponding to the training corpus to be labeled is acquired. Alternatively, it may be labeled manually.

At S704, the training corpus to be labeled and the labeled triplet information are added to a set of training corpora and a next training is continued.

The training corpus to be labeled and the labeled triplet information are added to the set of training corpora, and the set of training corpora is re-input into the triplet information extraction network, and repeat the above steps for training until it meets a preset end condition.

Alternatively, the preset end condition may be: training ends after training a preset training number of times.

Alternatively, the preset end condition may be: training ends after the minimum confidence of the prediction results is greater than the set confidence threshold.

In the embodiment of the disclosure, when the set of training corpora is acquired, the triplet information extraction network is iteratively trained based on a batch of training corpora in the set of training corpora, thereby gradually improving the effect of improving a model and acquiring more accurate triplet information.

Figure 9:
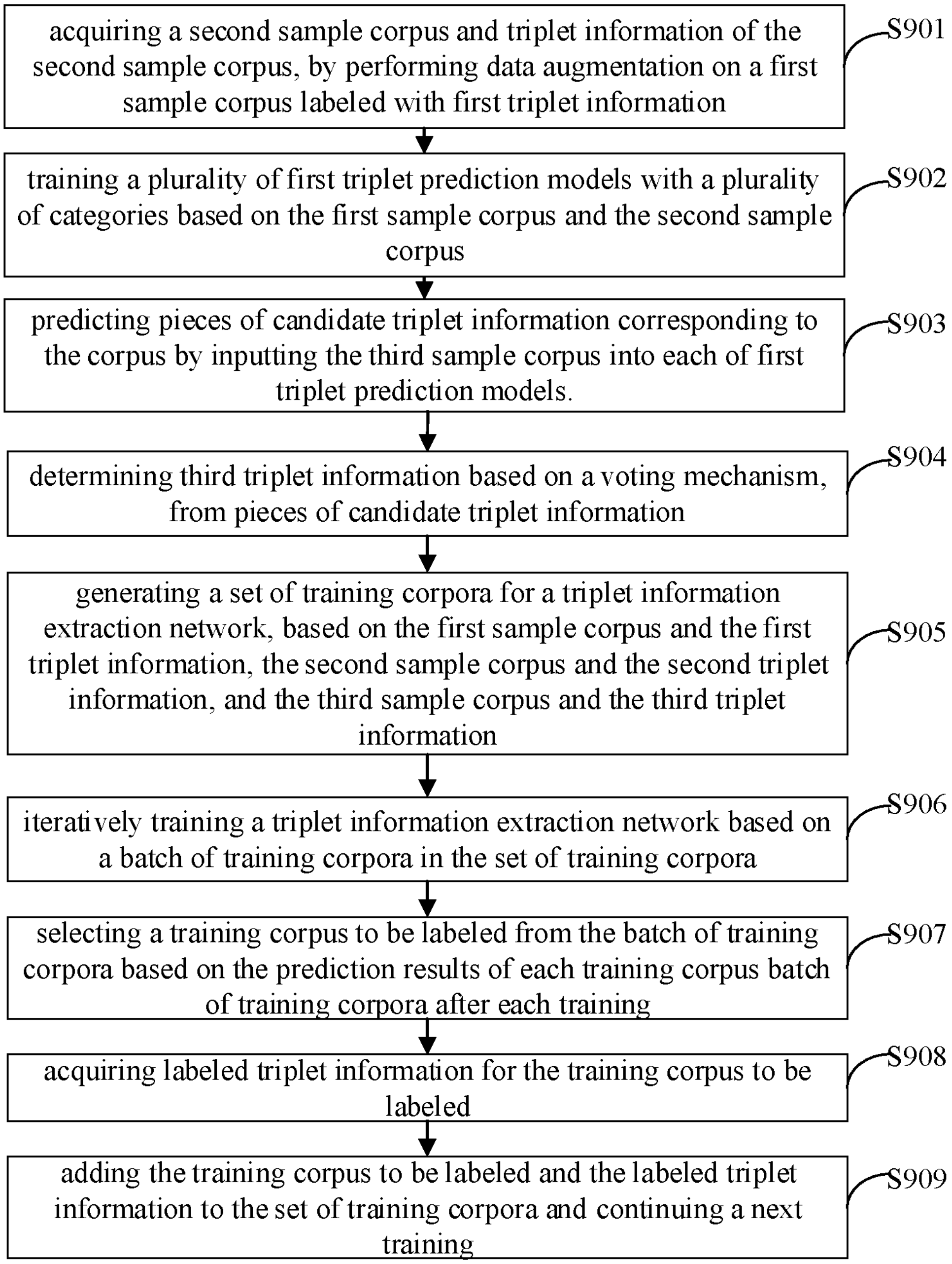
FIG. 9 is a diagram illustrating a method for data augmentation according to an example of the present disclosure.

FIG. 9 is an example illustrating a method for data augmentation in the present disclosure. As illustrated in FIG. 9, the method for sample augmentation includes the following steps at S901-S909.

At S901, a second sample corpus and triplet information of the second sample corpus are acquired, by performing data augmentation on a first sample corpus labeled with first triplet information.

At S902, a plurality of first triplet prediction models with a plurality of categories are trained based on the first sample corpus and the second sample corpus.

At S903, pieces of candidate triplet information corresponding to the corpus is predicted by inputting the third sample corpus into each of first triplet prediction models.

At S904, third triplet information is determined based on a voting mechanism, from pieces of candidate triplet information.

With respect to the implementation of steps at S901 to S904, implementations in embodiments of the disclosure may be adopted, which may not be repeated here.

At S905, a set of training corpora for a triplet information extraction network is generated, based on the first sample corpus and the first triplet information, the second sample corpus and the second triplet information, as well as the third sample corpus and the third triplet information.

At S906, the triplet information extraction network is iteratively trained based on a batch of training corpora in the set of training corpora.

At S907, a training corpus to be labeled is selected from the batch of training corpora based on prediction results of each training corpus in the batch of training corpora after each training.

At S908, labeled triplet information for the training corpus to be labeled is acquired.

At S909, the training corpus to be labeled and the labeled triplet information are added to the set of training corpora and a next training is continued.

With respect to the implementation of steps at S905 to S909, implementations in embodiments of the disclosure may be adopted, which may not be repeated here.

In the method for data augmentation according to the disclosure, the second sample corpus and second triplet information of the second sample corpus are acquired, by performing data augmentation on the first sample corpus labeled with first triplet information; the third triplet information of the third sample corpus is acquired, by performing SSL on the third sample corpus without triplet information; and the set of training corpora for the triplet information extraction network is generated, based on the first sample corpus and the first triplet information, the second sample corpus and the second triplet information, and the third sample corpus and the third triplet information. Data augmentation and SSL in the disclosure may expand data, and may significantly improve an extraction effect of SPO triplet. The data quality generated by data augmentation is relatively high, and SSL may dramatically reduce a model prediction variance and improve a model effect by a multi-model voting method. Therefore, based on the method in the disclosure, only a small amount of labeled data is needed to achieve a good result, which greatly reduces the labor cost.

Figure 10:
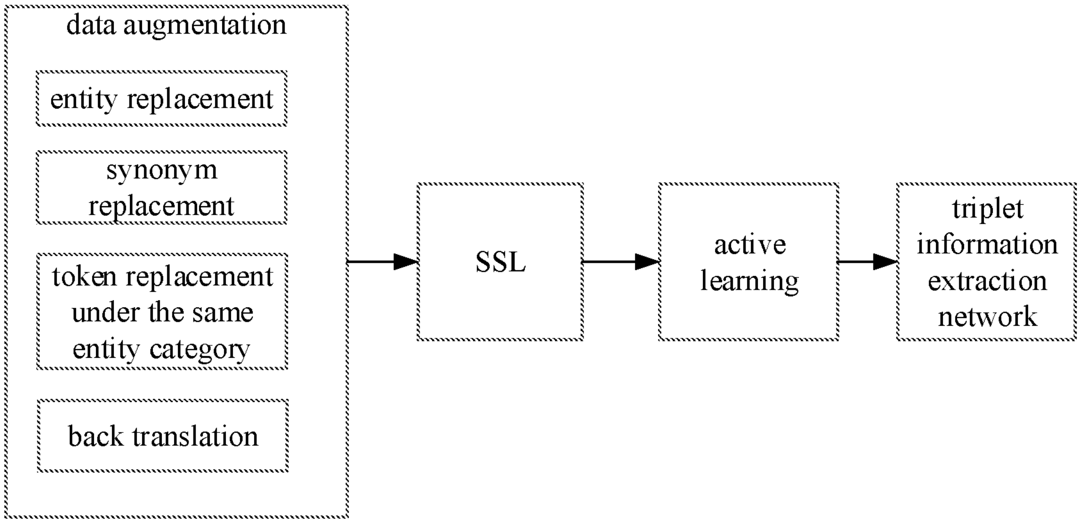
FIG. 10 is a diagram illustrating a method for data augmentation according to an example of the present disclosure.

FIG. 10 is an example of a method for sample augmentation according to the disclosure. As illustrated in FIG. 10, the method for sample augmentation acquires the second sample corpus and the second triplet information by performing data augmentation on the first sample corpus based on at least one data augmentation operation of: entity replacement, synonym replacement, token replacement of the same entity category and back translation. The third triplet information of the third sample corpus is acquired, by performing SSL on the third sample corpus without triplet information. A set of training corpora for the triplet information extraction network is generated for active learning based on the first sample corpus and the first triplet information, the second sample corpus and the second triplet information, and the third sample corpus and the third triplet information. That is, the trained triplet information extraction network is finally acquired by iteratively training the triplet information extraction network.

Figure 11:
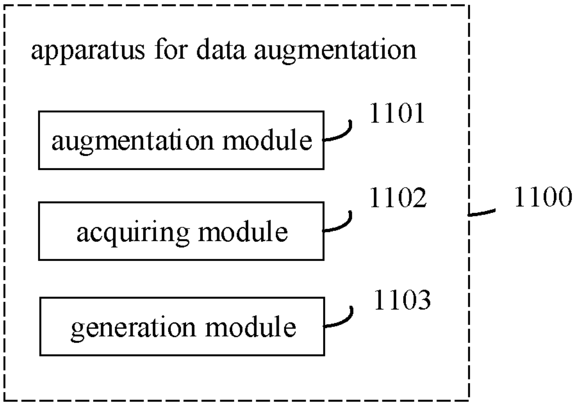
FIG. 11 is a diagram illustrating an apparatus for data augmentation according to an example of the present disclosure.

FIG. 11 is an example diagram illustrating an apparatus for data augmentation in the present disclosure. As illustrated in FIG. 11, the apparatus for sample augmentation includes an augmentation module 1101, an acquiring module 1102 and a generation module 1103.

The augmentation module 1101 is configured to acquire a second sample corpus and triplet information of the second sample corpus, by performing data augmentation on a first sample corpus labeled with first triplet information.

The acquiring module 1102 is configured to acquire third triplet information of sample corpus, by performing SSL on the third sample corpus without triplet information.

The generation module 1103 is configured to generate a set of training corpora for a triplet information extraction network, based on the first sample corpus and the first triplet information, the second sample corpus and the second triplet information, and the third sample corpus and the third triplet information.

Further, the apparatus 1100 for sample augmentation further includes a training module 1104. The training module 1104 is configured to iteratively train the triplet information extraction network based on a batch of training corpora in the set of training corpora; select a training corpus to be labeled from the batch of training corpora based on the prediction results of each training corpus in the batch of training corpora after each training; and add the training corpus to be labeled and the labeled triplet information to the set of training corpora and continue a next training.

Further, the augmentation module 1101 is further configured to: acquire the second sample corpus and the second triplet information by performing data augmentation on the first sample corpus based on at least one data augmentation operation of: entity replacement, synonym replacement, token replacement of the same entity category and back translation.

Further, the augmentation module 1101 is further configured to: generate the second triplet information by performing entity replacement on each entity in the first triplet information; determine a position where each entity in the first triplet information is located in the first sample corpus; and generate the second sample corpus by replacing the entity at the determined position with an entity in the second triplet information.

Further, the augmentation module 1101 is further configured to: recognize whether there is an overlapping relationship between entities in the first triplet information; determine a target entity dictionary for entity replacement based on a recognition result; and generate the second triplet information by performing entity replacement on each entity in the first triplet information based on the target entity dictionary.

Further, the augmentation module 1101 is further configured to: acquire a category of each entity in the first triplet information in response to the recognition result indicating that there is no overlapping relationship between the entities;

and determine the entity dictionary corresponding to the category of each entity as the target entity dictionary.

Further, the augmentation module 1101 is further configured to: acquire an overlapping entity dictionary as the target entity dictionary corresponding to overlapping entities in response to the recognition result indicating that there is an overlapping relationship between the entities, the overlapping entity dictionary includes entity pairs with an overlapping relationship.

Further, the augmentation module 1101 is further configured to: acquire an entity category pair from the entity pairs with the overlapping relationship in the first triplet information; acquire a replacement entity pair matching the entity category pair from the overlapping entity dictionary; and generate the second triplet information by performing entity replacement on the entity pair with the overlapping relationship based on the replacement entity pair.

Further, the augmentation module 1101 is further configured to: acquire candidate tokens by segmenting the first sample corpus; and generate the second sample corpus by performing synonym replacement on a token other than the entity in the first sample corpus, the second triplet information is the same as the first triplet information.

Further, the augmentation module 1101 is further configured to: acquire candidate tokens by segmenting the first sample corpus; select a token labeled with an entity category from the candidate tokens, as a target token to be replaced; acquire a replacement token of the same entity category to which the target token belongs; generate the second sample corpus by replacing the target token in the first sample corpus with the replacement token; and generate the second triplet information by updating the first triplet information based on the substitute token.

Further, the augmentation module 1101 is further configured to: replace an entity reference in the first sample corpus with a target symbol; generate an intermediate sample corpus by translating the first sample corpus replaced with the target symbol; and acquire the second sample corpus, by back translating the intermediate sample corpus and replacing the target symbol in back-translated sample corpus with an entity, the second triplet information is the same as the first triplet information.

Further, the acquiring module 1102 is further configured to: train a plurality of first triplet prediction models with a plurality of categories based on the first sample corpus and the second sample corpus; predict pieces of candidate triplet information corresponding to the third sample corpus by inputting the third sample corpus into each of the first triplet prediction models; and determine the third triplet information based on a voting mechanism from the pieces of candidate triplet information.

Further, the training module 1104 is further configured to: acquire tokens of the training corpus by segmenting the training corpus, and acquire a word coding of each of the tokens; output a semantic representation vector of each of the tokens, by inputting the word coding of each of the tokens into a pre-trained language model in the triplet information extraction network for context association; output prediction triplet information of the training corpus, by inputting the semantic representation vector of each of the tokens into a multi-pointer classification model for entity category prediction; and generate a target triplet information extraction network, by adjusting the triplet information extraction network based on the labeled triplet information of the training corpus and the prediction triplet information.

Further, the training module 1104 is further configured to: acquire first candidate entities predicted as a first entity category in the training corpus, and second candidate entities predicted as a second entity category; select an entity with a prediction probability greater than a first set threshold from the first candidate entities, and determine the entity as a target first entity; select an entity with a prediction probability greater than a second set threshold from the second candidate entities, and determine the entity as a target second entity; and generate prediction triplet information of the training corpus based on the target first entity and the target second entity.

Further, the training module 1104 is further configured to: determine a first entity pair by combining a target first entity with a target second entity, and generate prediction triplet information of a training corpus based on the entity relationship between the first entity pair and further configured the first entity pair.

Further, the training module 1104 is further configured to: acquire a distance between a target first entity and a target second entity, determine a second entity pair based on the distance, and generate prediction triplet information of a training corpus based on the entity relationship between the first entity pair and the first entity pair.

Further, the training module 1104 is further configured to: acquire a distance between a target first entity and a target second entity; determine a third entity pair based on the distance and positions of the target first entity and the target second entity located in the training corpus; and generate prediction triplet information of the training corpus based on an entity relationship of the third entity pair and the third entity pair.

Figure 12:
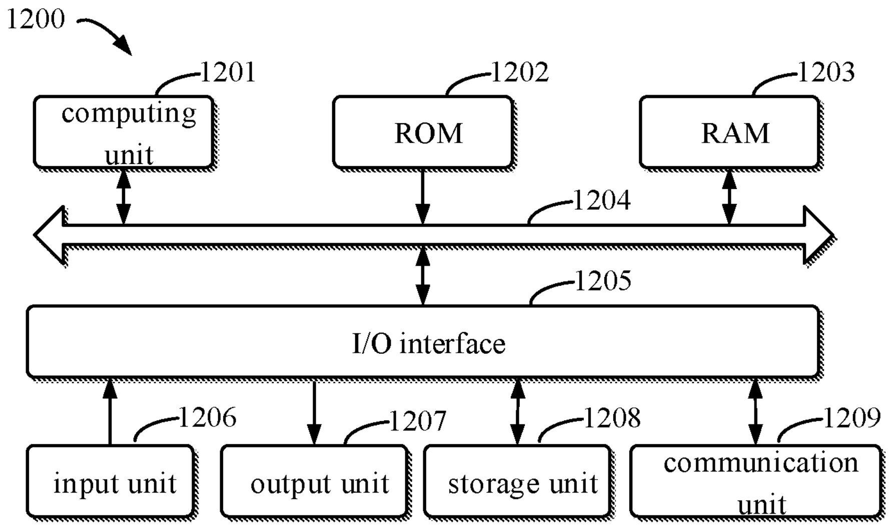
FIG. 12 is a diagram illustrating an electronic device according to an example of the present disclosure.

In the embodiment of the present disclosure, an electronic device, a readable storage medium and a computer program product are further provided according to embodiments of the present disclosure FIG. 12 is a schematic block diagram illustrating an example electronic device 1200 in the embodiment of the present disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 12, a device 1200 includes a computing unit 1201, configured to execute various appropriate actions and processes according to a computer program stored in a read-only memory (ROM) 1202 or loaded from a memory unit 1208 to a random access memory (RAM) 1203. In the RAM 1203, various programs and data required for a device 1200 may be stored. The computing unit 1201, the ROM 1202 and the RAM 1203 may be connected with each other by a bus 1204. An input/output (I/O) interface 1205 is also connected to the bus 1204.

A plurality of components in the device 1200 are connected to the I/O interface 1205, and includes: an input unit 1206, for example, a keyboard, a mouse, etc.; an output unit 1207, for example various types of displays, speakers; a memory unit 1208, for example a magnetic disk, an optical disk; and a communication unit 1209, for example, a network card, a modem, a wireless transceiver. The communications unit 1209 allows a device 1200 to exchange information/data through a computer network such as internet and/or various types of telecommunication networks and other devices.

The computing unit 1201 may be various types of general and/or dedicated processing components with processing and computing ability. Some examples of the computing unit 1201 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 1201 executes various methods and processes as described above, for example, a method for sample augmentation. For example, in some embodiments, the method for sample augmentation may be further implemented as a computer software program, which is physically contained in a machine readable medium, such as the storage unit 1208. In some embodiments, a part or all of the computer program may be loaded and/or installed on the device 1200 through the ROM 1202 and/or the communication unit 1209. When the computer program is loaded on the RAM 1203 and executed by the computing unit 1201, one or more steps in the method for sample augmentation as described above may be performed. Alternatively, in other embodiments, the computing unit 1201 may be configured to execute a method for sample augmentation in other appropriate ways (for example, by virtue of a firmware).

Various implementation modes of systems and technologies described herein may be implemented in a digital electronic circuit system, an integrated circuit system, a field programmable gate array (FPGA), a dedicated application specific integrated circuit (ASIC), a system on a chip (SoC), a load programmable logic device (CPLD), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

The computer codes configured to execute a method in the present disclosure may be written with one or any combination of multiple programming languages. These programming languages may be provided to a processor or a controller of a general purpose computer, a dedicated computer, or other apparatuses for programmable data processing so that the function/operation specified in the flowchart and/or block diagram may be performed when the program code is executed by the processor or controller. The computer codes may be executed completely or partly on the machine, executed partly on the machine as an independent software package and executed partly or completely on the remote machine or server.

In the context of the present disclosure, a machine-readable medium may be a tangible medium that may contain or store a program intended for use in or in conjunction with an instruction execution system, apparatus, or device. The machine-readable medium may be a machine readable signal medium or a machine readable storage medium. The machine readable storage medium may include but not limited to an electronic, magnetic, optical, electromagnetic, infrared, or semiconductor system, apparatus or device, or any appropriate combination thereof. The more specific example of the machine readable storage medium includes an electronic connector with one or more cables, a portable computer disk, a hardware, a random access memory (RAM), a read-only memory (ROM), an erasable programmable read-only memory (an EPROM or a flash memory), an optical fiber device, and a portable optical disk read-only memory (CDROM), an optical storage device, a magnetic storage device, or any appropriate combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), a blockchain network, and an internet.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, and further may be a server with a distributed system, or a server in combination with a blockchain.

It should be understood that, various forms of procedures shown above may be configured to reorder, add or delete steps. For example, the steps described in the present disclosure may be executed in parallel, sequentially, or in a different order, as long as the desired result of the technical solution disclosed in the present disclosure may be achieved, which will not be limited herein.

The above specific implementations do not constitute a limitation on the protection scope of the present disclosure. Those skilled in the art should understand that various modifications, combinations, sub-combinations and substitutions may be made according to design requirements and other factors. Any modification, equivalent replacement, improvement, etc., made within the principle of embodiments of the present disclosure shall be included within the protection scope of embodiments of the present disclosure.

The invention claimed is:

1. A computer-implemented method for sample augmentation, applied to a knowledge graph and natural language processing, comprising:

acquiring a second sample corpus and second triplet information of the second sample corpus, by performing data augmentation on a first sample corpus labeled with first triplet information;

acquiring third triplet information of a third sample corpus, by performing semi-supervised learning on the third sample corpus that is not labeled with triplet information;

generating a set of training corpora for training a triplet information extraction network, based on the first sample corpus and the first triplet information, the second sample corpus and the second triplet information, as well as the third sample corpus and the third triplet information;

iteratively training the triplet information extraction network based on a batch of training corpora in the set of training corpora;

obtaining prediction results of each training corpus in the batch of training corpora after each training;

acquiring a confidence of each prediction result by summing a score corresponding to a subject entity and a score corresponding to an object entity in the prediction result;

sorting the confidence of each prediction result to take out a set number of training corpora with a lowest confidence as a training corpus to be labeled;

acquiring labeled triplet information for the training corpus to be labeled; and adding the training corpus to be labeled and the labeled triplet information to the set of training corpora and continuing a next training;

wherein iteratively training the triplet information extraction network comprises:

acquiring tokens of each training corpus in the batch of training corpora by segmenting the training corpus, and acquiring a word coding of each of the tokens;

outputting a semantic representation vector of each of the tokens by inputting the word coding of each of the tokens into a pre-trained language model in the triplet information extraction network for context association;

outputting prediction triplet information of the training corpus, by inputting the semantic representation vector of each of the tokens into a multi-pointer classification model for entity category prediction; and generating a target triplet information extraction network, by adjusting the triplet information extraction network based on the labeled triplet information of the training corpus and the prediction triplet information;

wherein performing the semi-supervised learning on the third sample corpus that is not labeled with triplet information comprises:

training a plurality of first triplet prediction models with a plurality of categories based on the first sample corpus and the second sample corpus;

predicting pieces of candidate triplet information corresponding to the third sample corpus by inputting the third sample corpus into each of the first triplet prediction models; and determining the third triplet information based on a voting mechanism from the pieces of candidate triplet information.

2. The method of claim 1, wherein acquiring the second sample corpus and second triplet information of the second sample corpus comprises:

acquiring the second sample corpus and the second triplet information, by performing data augmentation on the first sample corpus based on at least one data augmentation operation of: entity replacement, synonym replacement, token replacement of the same entity category and back translation.

3. The method of claim 2, wherein acquiring the second sample corpus and the second triplet information comprises:

generating the second triplet information by performing entity replacement on each entity in the first triplet information;

determining a position where each entity in the first triplet information is located in the first sample corpus; and generating the second sample corpus by replacing the entity at the determined position with an entity in the second triplet information.

4. The method of claim 3, wherein generating the second triplet information by performing entity replacement on the entity in the first triplet information, comprises:

recognizing whether there is an overlapping relationship between entities in the first triplet information;

determining a target entity dictionary for entity replacement based on a recognition result; and generating the second triplet information by performing entity replacement on each entity in the first triplet information based on the target entity dictionary.

5. The method of claim 4, wherein determining the target entity dictionary for entity replacement based on the recognition result, comprises:

acquiring a category of each entity in the first triplet information in response to the recognition result indicating that there is no overlapping relationship between the entities; and determining an entity dictionary corresponding to the category of each entity as the target entity dictionary.

6. The method of claim 4, wherein determining the target entity dictionary for entity replacement based on the recognition result, comprises:

acquiring an overlapping entity dictionary as the target entity dictionary, in response to the recognition result indicating that there is an overlapping relationship between the entities, wherein the overlapping entity dictionary comprises entity pairs with an overlapping relationship.

7. The method of claim 6, wherein performing entity replacement on each entity in the first triplet information based on the target entity dictionary, comprises:

acquiring an entity pair with the overlapping relationship in the first triplet information;

acquiring a replacement entity pair matching the entity pair in the first triplet information from the overlapping entity dictionary; and generating the second triplet information by performing entity replacement on the entity pair with the overlapping relationship based on the replacement entity pair.

8. The method of claim 2, wherein acquiring the second sample corpus and the second triplet information comprises:

acquiring candidate tokens by segmenting the first sample corpus; and generating the second sample corpus by performing synonym replacement on a token other than tokens belonging to the entity in the first sample corpus, wherein the second triplet information is the same as the first triplet information.

9. The method of claim 2, wherein acquiring the second sample corpus and the second triplet information comprises:
- acquiring candidate tokens by segmenting the first sample corpus; and
- selecting a token labeled with an entity category from the candidate tokens, as a target token;
- acquiring a replacement token of the same entity category to which the target token belongs;
- generating the second sample corpus by replacing the target token in the first sample corpus with the replacement token; and
- generating the second triplet information by updating the first triplet information based on the replacement token.

10. The method of claim 2, wherein acquiring the second sample corpus and the second triplet information comprises:
- obtaining a replaced first sample corpus by replacing an entity in the first sample corpus with a target symbol;
- generating an intermediate sample corpus by translating the replaced first sample corpus; and
- acquiring the second sample corpus, by back translating the intermediate sample corpus and replacing the target symbol in the back-translated sample corpus with the entity, wherein the second triplet information is the same as the first triplet information.

11. The method of claim 1, wherein outputting the prediction triplet information of the training corpus comprises:
- acquiring first candidate entities predicted as a first entity category in the training corpus, and second candidate entities predicted as a second entity category;
- selecting an entity with a prediction probability greater than a first set threshold from the first candidate entities, as a target first entity;
- selecting an entity with the prediction probability greater than a second set threshold from the second candidate entities, as a target second entity; and
- generating the prediction triplet information of the training corpus based on the target first entity and the target second entity.

12. The method of claim 11, wherein generating the prediction triplet information of the training corpus based on the target first entity and the target second entity, comprises:
- determining a first entity pair by combining the target first entity and the target second entity; and
- generating the prediction triplet information of the training corpus based on the first entity pair and an entity relationship in the first entity pair.

13. The method of claim 11, wherein generating the prediction triplet information of the training corpus based on the target first entity and the target second entity, comprises:
- acquiring a distance between the target first entity and the target second entity, and determining a second entity pair based on the distance; and
- generating the prediction triplet information of the training corpus based on the second entity pair and an entity relationship in the second entity pair.

14. The method of claim 11, wherein generating the prediction triplet information of the training corpus based on the target first entity and the target second entity, comprises:
- acquiring a distance between the target first entity and the target second entity;
- determining a third entity pair based on the distance and positions of the target first entity and the target second entity located in the training corpus; and
- generating the prediction triplet information of the training corpus based on the third entity pair and an entity relationship in the third entity pair.

15. An electronic device, applied to a knowledge graph and natural language processing, the electronic device comprising:
- at least one processor; and
- a memory stored with instructions executable by the at least one processor, wherein when the instructions are performed by the at least one processor, the at least one processor is caused to perform a method for sample augmentation, the method comprising:
- acquiring a second sample corpus and second triplet information of the second sample corpus, by performing data augmentation on a first sample corpus labeled with first triplet information;
- acquiring third triplet information of a third sample corpus, by performing semi-supervised learning on the third sample corpus that is not labeled with triplet information;
- generating a set of training corpora for training a triplet information extraction network, based on the first sample corpus and the first triplet information, the second sample corpus and the second triplet information, as well as the third sample corpus and the third triplet information;
- iteratively training the triplet information extraction network based on a batch of training corpora in the set of training corpora;
- obtaining prediction results of each training corpus in the batch of training corpora after each training;
- acquiring a confidence of each prediction result by summing a score corresponding to a subject entity and a score corresponding to an object entity in the prediction result;
- sorting the confidence of each prediction result to take out a set number of training corpora with a lowest confidence as a training corpus to be labeled;
- acquiring labeled triplet information for the training corpus to be labeled; and
- adding the training corpus to be labeled and the labeled triplet information to the set of training corpora and continuing a next training;
- wherein iteratively training the triplet information extraction network comprises:
- acquiring tokens of each training corpus in the batch of training corpora by segmenting the training corpus, and acquiring a word coding of each of the tokens;
- outputting a semantic representation vector of each of the tokens by inputting the word coding of each of the tokens into a pre-trained language model in the triplet information extraction network for context association;
- outputting prediction triplet information of the training corpus, by inputting the semantic representation vector of each of the tokens into a multi-pointer classification model for entity category prediction; and
- generating a target triplet information extraction network, by adjusting the triplet information extraction network based on the labeled triplet information of the training corpus and the prediction triplet information;
- wherein performing the semi-supervised learning on the third sample corpus that is not labeled with triplet information comprises:
- training a plurality of first triplet prediction models with a plurality of categories based on the first sample corpus and the second sample corpus;
- predicting pieces of candidate triplet information corresponding to the third sample corpus by inputting the third sample corpus into each of the first triplet prediction models; and determining the third triplet information based on a voting mechanism from the pieces of candidate triplet information.

16. A non-transitory computer-readable storage medium having computer instructions stored thereon, wherein the computer instructions are configured to cause a computer to perform a method for sample augmentation, applied to a knowledge graph and natural language processing, the method comprising:

acquiring a second sample corpus and second triplet information of the second sample corpus, by performing data augmentation on a first sample corpus labeled with first triplet information;

acquiring third triplet information of a third sample corpus, by performing semi-supervised learning on the third sample corpus that is not labeled with triplet information;

generating a set of training corpora for training a triplet information extraction network, based on the first sample corpus and the first triplet information, the second sample corpus and the second triplet information, as well as the third sample corpus and the third triplet information;

iteratively training the triplet information extraction network based on a batch of training corpora in the set of training corpora;

obtaining prediction results of each training corpus in the batch of training corpora after each training;

acquiring a confidence of each prediction result by summing a score corresponding to a subject entity and a score corresponding to an object entity in the prediction result;

sorting the confidence of each prediction result to take out a set number of training corpora with a lowest confidence as a training corpus to be labeled;

acquiring labeled triplet information for the training corpus to be labeled; and adding the training corpus to be labeled and the labeled triplet information to the set of training corpora and continuing a next training;

wherein iteratively training the triplet information extraction network comprises:

acquiring tokens of each training corpus in the batch of training corpora by segmenting the training corpus, and acquiring a word coding of each of the tokens;

outputting a semantic representation vector of each of the tokens by inputting the word coding of each of the tokens into a pre-trained language model in the triplet information extraction network for context association;

outputting prediction triplet information of the training corpus, by inputting the semantic representation vector of each of the tokens into a multi-pointer classification model for entity category prediction; and generating a target triplet information extraction network, by adjusting the triplet information extraction network based on the labeled triplet information of the training corpus and the prediction triplet information;

wherein performing the semi-supervised learning on the third sample corpus that is not labeled with triplet information comprises:

training a plurality of first triplet prediction models with a plurality of categories based on the first sample corpus and the second sample corpus;

predicting pieces of candidate triplet information corresponding to the third sample corpus by inputting the third sample corpus into each of the first triplet prediction models; and determining the third triplet information based on a voting mechanism from the pieces of candidate triplet information.

* * * * *